(12) United States Patent
Koonankeil (10) Patent No.: US 7,574,035 B2
(45) Date of Patent: Aug. 11, 2009

(54) SYSTEM AND METHOD FOR INSPECTION OF HOLE LOCATION ON TURBINE AIRFOILS

(75) Inventor: James M. Koonankeil, Marlborough, CT (US)

(73) Assignee: United Technologies Corporation, Hartford, CT (US)

( * ) Notice: Subject to any disclaimer, the term of this patent is extended or adjusted under 35 U.S.C. 154(b) by 735 days.

(21) Appl. No.: 11/402,366

(22) Filed: Apr. 7, 2006

(65) Prior Publication Data

US 2007/0276629 A1 Nov. 29, 2007

(51) Int. Cl.
- G06K 9/00 (2006.01)
- H04N 7/18 (2006.01)
- G01B 11/14 (2006.01)
- G01B 7/00 (2006.01)
- F01D 5/18 (2006.01)

(52) U.S. Cl. .................. 382/152; 382/141; 348/86; 348/92; 348/94; 356/615; 702/150; 702/157; 415/118; 416/61

(58) Field of Classification Search ......... 382/141–152; 348/86–112; 356/612–624; 702/127, 150–167; 416/61; 415/118
See application file for complete search history.

(56) References Cited

U.S. PATENT DOCUMENTS

| | | | | |
|---|---|---|---|---|
| 4,596,037 A | * | 6/1986 | Bouchard et al. | 382/141 |
| 4,803,639 A | | 2/1989 | Steele et al. | |
| 4,908,782 A | * | 3/1990 | Pekarek et al. | 702/167 |
| 5,027,417 A | * | 6/1991 | Kitakado et al. | 382/148 |
| 5,047,966 A | | 9/1991 | Crow et al. | |
| 5,111,046 A | * | 5/1992 | Bantel | 250/330 |
| 5,111,406 A | * | 5/1992 | Zachman et al. | 700/160 |
| 5,125,035 A | | 6/1992 | McCarthy et al. | |
| 5,184,217 A | * | 2/1993 | Doering | 348/88 |
| 5,430,478 A | * | 7/1995 | Kaye et al. | 348/99 |
| 5,483,603 A | * | 1/1996 | Luke et al. | 382/147 |
| 5,583,948 A | * | 12/1996 | Shibayama | 382/141 |
| 5,625,446 A | | 4/1997 | Bedard | |
| 5,848,115 A | * | 12/1998 | Little et al. | 378/4 |
| 5,971,710 A | * | 10/1999 | Stauffer et al. | 416/191 |
| 6,380,512 B1 | * | 4/2002 | Emer | 219/121.71 |

(Continued)

OTHER PUBLICATIONS

Rosemau et al. (Mar. 1999) "Aircraft engine blade cooling holes detection and classification from infrared images." SPIE vol. 3586, pp. 85-93.*

(Continued)

Primary Examiner—Brian P Werner
Assistant Examiner—Barry Drennan
(74) Attorney, Agent, or Firm—Kinney & Lange, P.A.

(57) ABSTRACT

An inspection system for locating multiple features on an exterior of an object includes a fixture, a camera, a computer and software. The fixture secures the object and includes a plurality of nest points for mating with specific positions on the exterior of the object, and a reference point located at a specific position relative to the nest points and within a best-plane of the object. The camera is positioned normal to the best-plane of the object and obtains video imaging of a plurality of the features and the reference point. The computer communicates with the camera and collects the video imaging. The software determines the actual parameters of the features relative to the reference point based on the video imaging.

18 Claims, 6 Drawing Sheets

U.S. PATENT DOCUMENTS

| | | |
|---|---|---|
| 6,522,993 B1 | 2/2003 | Tomko |
| 6,768,812 B1 | 7/2004 | Koljonen |
| 6,909,800 B2 * | 6/2005 | Vaidyanathan ............... 382/152 |
| 6,969,821 B2 | 11/2005 | Mika et al. |
| 6,977,356 B2 * | 12/2005 | Vaidyanathan et al. . 219/121.71 |
| 7,329,832 B2 * | 2/2008 | Hoebel et al. .......... 219/121.71 |
| 2003/0025087 A1 * | 2/2003 | Schamber et al. ........ 250/491.1 |
| 2004/0183900 A1 * | 9/2004 | Karpen et al. .................. 348/92 |
| 2005/0217131 A1 | 10/2005 | Varsell et al. |

OTHER PUBLICATIONS

Shetty et al. (Oct. 2006) "Optical inspection of holes in jet engine blades." SPIE vol. 6382, article 638208.*

* cited by examiner

SYSTEM AND METHOD FOR INSPECTION OF HOLE LOCATION ON TURBINE AIRFOILS

BACKGROUND OF THE INVENTION

This invention relates generally to systems and methods for inspecting manufactured articles and more particularly to systems and methods for locating hole features on a manufactured article.

In gas turbine engines, fuel is combusted in compressed air in order to accelerate high-density air and to produce thrust, which, in turn, are used to turn a turbine shaft and drive an aircraft, respectively. During the combustion process, the air is heated to super-high temperatures in order to accelerate the air to produce the thrust. Thus, blades of the turbine, which are downstream of the combustion process, are also subject to super-high temperatures. In order to facilitate cooling of the blades, many turbine blades incorporate complex systems of internal cooling passages into which compressor bleed air, or another cooling fluid, is directed to cool the blade. The cooling air exits the blade through a system of holes arranged in such a manner that the exterior surface of the blade is cooled, and is then passed out of the engine with the rest of the exhausted gases.

In some turbine blade embodiments, the exit holes are arranged in a specific pattern on various facets of the blade to create a surface cooling film. The surface cooling film creates a layer of cool air, which insulates the airfoil from the hot gases of the combustion process. In order to ensure that the surface cooling film properly forms, various shaped exit holes are precisely located and bored at various angles on the surface of the blade. Thus, after manufacture it is necessary to inspect the blades to ensure the holes are properly positioned. Current inspection systems require inspection of each cooling hole from a gun-barrel view, which typically requires the use of a five-axis computer numerically controlled (CNC) machine for moving the probe. Due to the CNC machine, such systems are quite expensive and take up a large amount of floor space in production facilities. Also, for example, since as many as eighty holes must be individually inspected on each blade, inspection of a single blade may take as long as ten minutes. Therefore, there is a need for improved methods and systems for quickly and accurately determining the location of holes and other features on the surface of a turbine blade.

BRIEF SUMMARY OF THE INVENTION

The present invention is directed toward an inspection system for locating multiple features on an exterior of an object. The inspection system includes a fixture, a camera, a computer and software. The fixture secures the object and includes a plurality of nest points for mating with specific positions on the exterior of the object, and a reference point located at a specific position relative to the nest points and within a best-plane of the object. The camera is positioned normal to the best-plane of the object and obtains video imaging of a plurality of the features and the reference point. The computer communicates with the camera and collects the video imaging. The software determines the actual location of the features relative to the reference point based on the video imaging.

DETAILED DESCRIPTION

Figure 1:
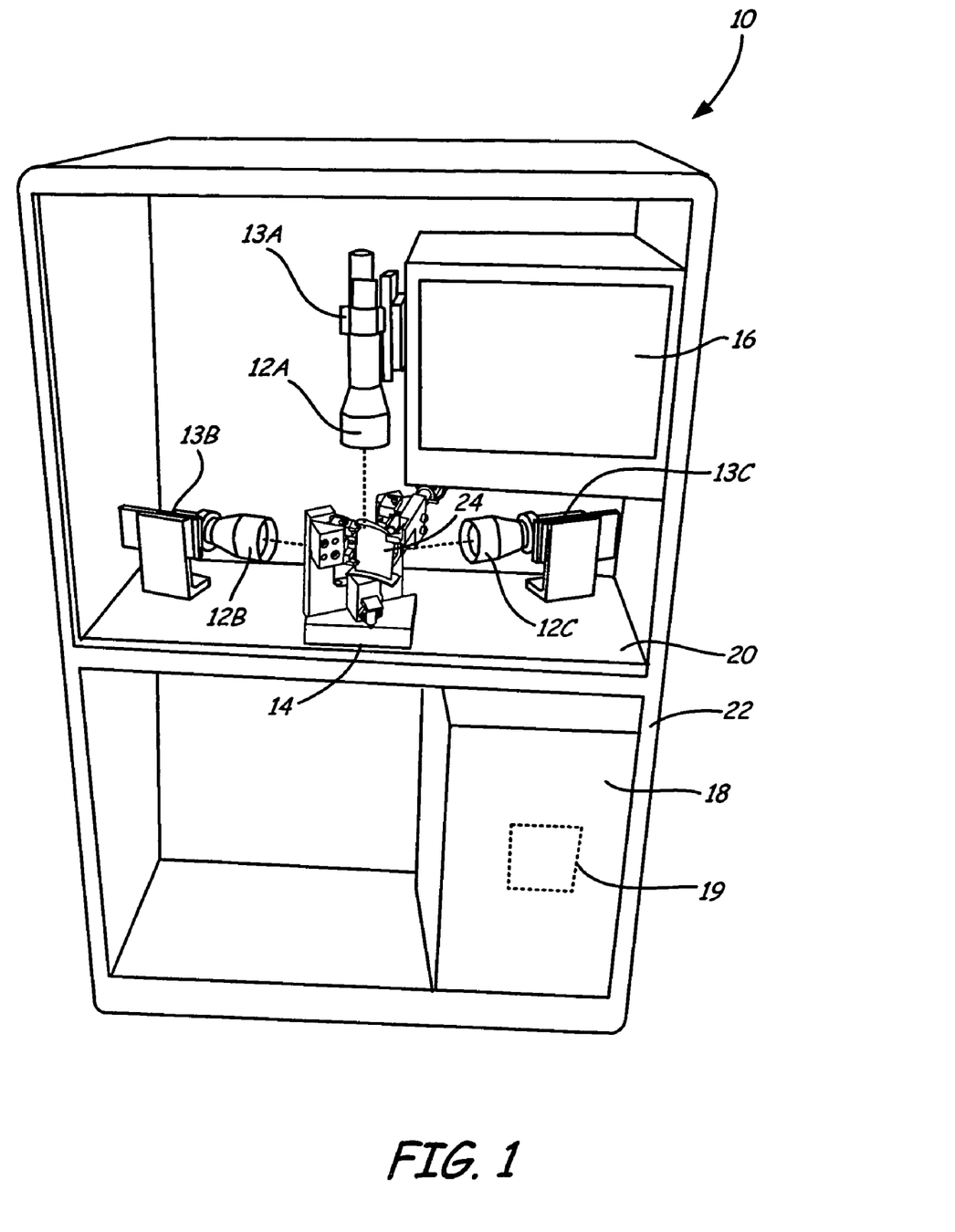
FIG. 1 shows a front view of an inspection system of the present invention.

FIG. 1 shows a front view of inspection system 10 of the present invention. Inspection system 10 quickly and accurately locates the position of multiple features in a target object utilizing a video imaging system. Inspection system 10 comprises cameras 12A-12C, LED light sources 13A-13C, fixture 14, monitor 16, computer 18 and software 19. Cameras 12A-12C and fixture 14 are positioned on tabletop 20 within housing 22. Fixture 14 secures the target object, such as turbine blade 24, using a plurality of nest points in a specific orientation on tabletop 20 with respect to cameras 12A-12C. Monitor 16 and other user interface equipment are positioned in user friendly positions within housing 22, and are connected with computer 18, which is positioned under tabletop 20 within housing 22. Computer 18 includes software 19, including video-imaging and data processing software, used to locate the position of features, such as cooling holes, on turbine blade 24 with respect to reference points on fixture 14 from video images of blade 24. Light sources 13A-13C are directed toward blade 24 to produce contrast between blade 24 and its features in the video images. Inspection system 10 is configured for locating the position of multiple holes on turbine blade 24 with a single video image. Thus, by using multiple video images from multiple cameras, an entire multi-faceted object or turbine blade can be inspected in a single procedure.

Figure 2:
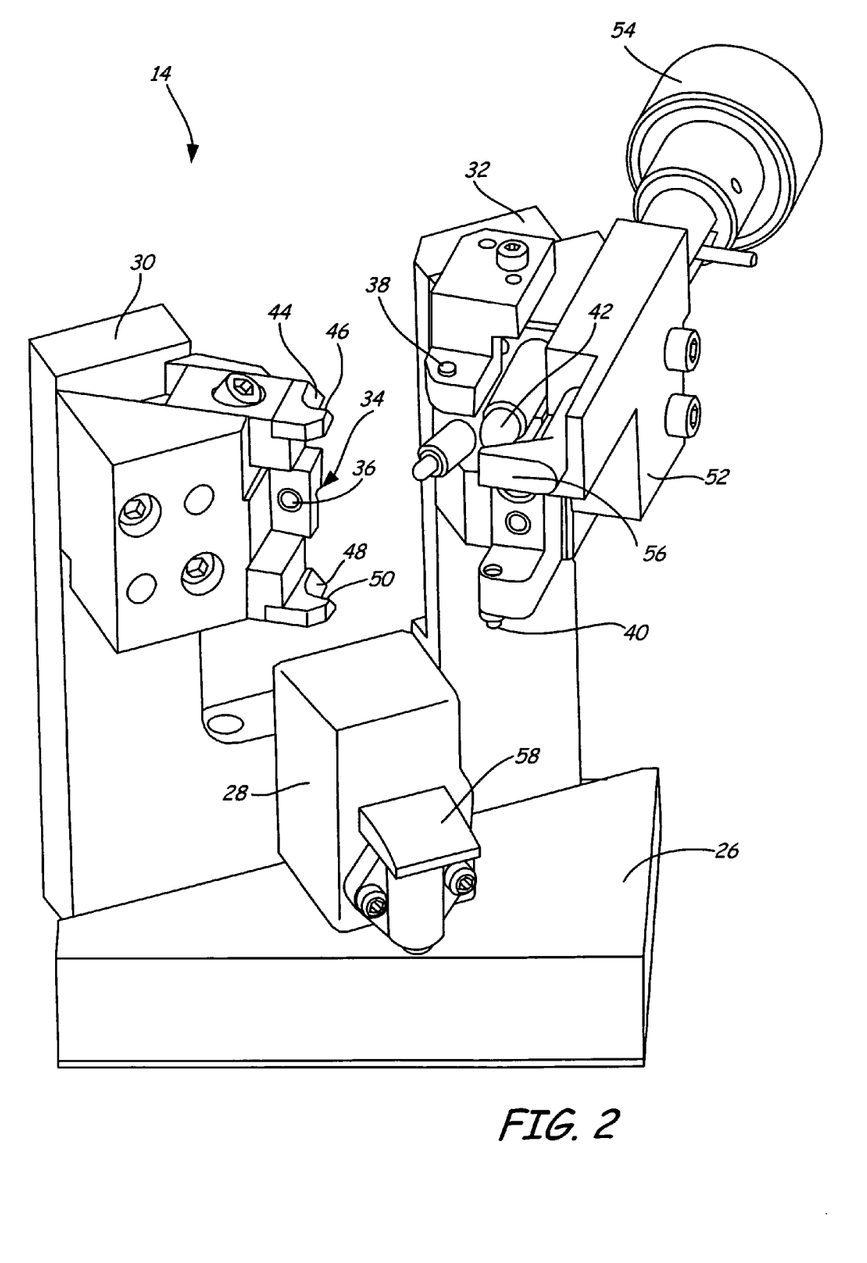
FIG. 2 shows a blade fixture for use in the inspection system of the present invention.

FIG. 2 shows fixture 14 that holds blade 24 on table top 20 in a specific orientation with respect to cameras 12A-12C. Fixture 14 and the position of cameras 12A-12C are customized for inspection of one particular model or style of turbine blade 24. As explained earlier, turbine blades include cooling holes on various facets of the blade through which internal cooling air exits in order to cool the external surfaces of the blade. Specifically, turbine blades typically have a convex facet (suction side), a concave facet (pressure side) and a radially outward facet (tip side) on which cooling holes are located. Blade 24 is mounted in fixture 14 in order to hold blade 24 in the sight of cameras 12A-12C so that the various cooling holes on the facets of blade 24 can be viewed, and so that cameras 12A-12C view blade 24 the same way every time. Fixture 14 comprises a vice that clamps onto blade 24 at specific nest points on the facets of blade 24. Thus, any position on blade 24 is always related to specific reference points on fixture 14 every time it is mounted in fixture 14. Fixture 14 includes platform 26, lateral support 28, first upright support 30 and second upright support 32, on which are located pressure side reference hole 34, suction side reference hole 36, top side reference hole 38, and nest points 40-50. Fixture 14 also includes clamp 52, knob 54, grip 56 and support 58, which provide a means for securing blade 24.

Knob 54 is rotated to move the position of clamp 52 relative to second upright support 32 through, for example, a threaded traversing mechanism. Grip 56 of clamp 34 is rotated upwards to accept blade 24, and then rotated back down and traversed with knob 54 in order to secure blade 24 at nest points 40-50. Nest point 40, located on second upright support 32, forms a rounded point for contacting the blade platform. Nest point 42, located on second upright support 32, comprises a rounded point that contacts the suction side of blade 24. Nest points 44-50 comprise linear edges that contact blade 24 at the leading edge, with point 44 and 48 on the suction side and points 46 and 50 on the pressure side. Typically, six nest points are used for turbine blades to ensure the blade is properly seated within the fixture. Blade 24 mounts within fixture 14 such that it contacts each nest point 40-50 at precise locations on the surface of blade 24. Once seated, the position of blade 24 is checked with, for example, a $\frac{1}{1000}$" feeler gauge to verify blade 24 is properly seated within fixture 14. Thus, blade 24 and other blades identically shaped will nest in fixture 14 the same every time.

Fixture 14 also includes reference points 34, 36 and 38, the positions of which on fixture 14 are known relative to nest points 40-50. Reference point 34 is located on first upright support 30 such that it can be viewed with the suction side of blade 24. Reference point 36 is located on first upright support 30 such that it can be viewed with the pressure side of blade 24. Reference point 38 is located on second upright support 32 such that it can be viewed with the tip side of blade 24. Therefore, once blade 24 is secured or nested within fixture 14, the orientation of blade 24 with respect to the reference points is known.

Typically, the reference points comprise holes in fixture 14 because they produce a high degree of contrast from the surface of blade 24 and can thus be easily detected in the video images. However, other indicators, such as depressions or colored marks, that produce contrasts between the indicator and the surface of blade 24 in cameras 12A-12C can be used. In another embodiment, reference points 34-38 comprise 0.125" dowel pins press fit into a steel fixture hole. The dowel includes a black anodized coating in order to produce sufficient contrast with blade 24 and fixture 14.

Typically, one reference hole is used for each camera, or for each facet of blade 24 requiring a camera. The locations of each cooling hole can then be charted on a relative coordinate system, based on, for example, one or more of reference points 34, 36 and 38. Fixture 14 is positioned on tabletop 20 in view of cameras 12A-12C such that each of the reference holes and all of the cooling holes are viewed by at least one camera. Thus, using multiple video images from relatively few, precisely positioned cameras, system 10 can locate the position of each feature or cooling hole relative to a reference point.

Figure 3:
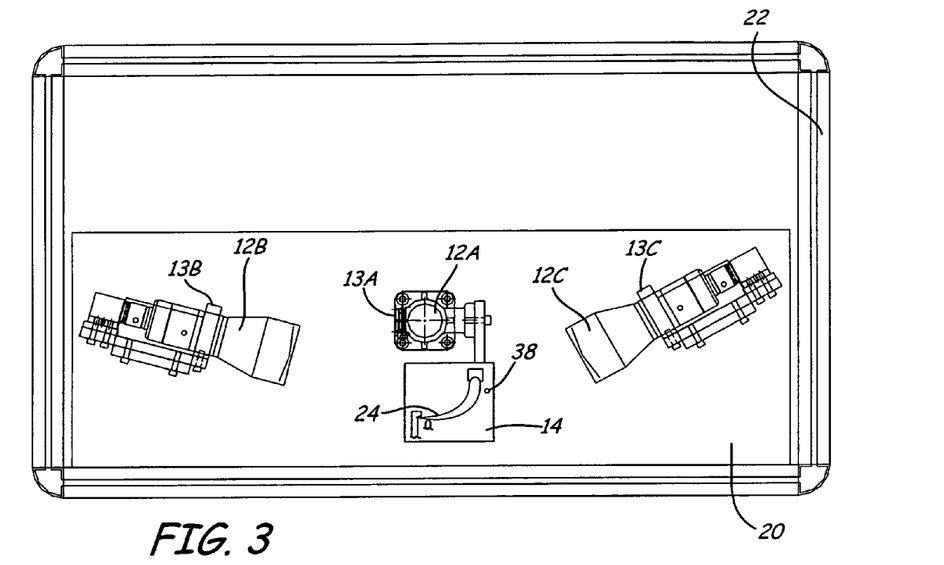
FIG. 3 shows a top view of the inspection system of FIG. 1 showing the camera layout.

FIG. 3 shows a top view of inspection system 10 of the present invention. In order to locate the positions of the cooling holes on the suction side, pressure side and top side, three cameras are typically used. In other embodiments, however, for more or less complex parts having more or less holed facets, more or less cameras can be used. Fixture 14 holds blade 24 in the line of sight of cameras 12A-12C such that cameras 12A-12C view the best-plane of each of the tip side, pressure side and suction side, respectively.

The best-plane defines a plane in which each of the cooling holes is visible from a single vantage point, i.e. a single camera. The number of best-planes is chosen based on the minimal number of planes required to locate every feature on blade 24. Preferably, for turbine blades, three best-planes are used. Each camera is typically focused on a best-plane for one of the convex, concave and radially outward facets of blade 24 such that it has a line of sight of every cooling hole on that side. The line of sight for each camera is set up perpendicular to its respective best-plane, and typically the reference point or hole is setup to be parallel with the best-plane. Camera 12A is set up to view the best-plane for the tip side, which is generally parallel to tabletop 20. Camera 12B is set up to view the best-plane of the pressure side of blade 24. Camera 12C is set up to view the best-plane of the suction side of blade 24. Thus, collectively they view all cooling holes 60 located on blade 24.

Cameras 12A-12C need not have a direct gun-barrel line of sight for each hole; they need only have, at least, an oblique view of each hole in the best-plane for which they are setup to view. By nesting blade 24 in fixture 14, cameras 12A-12C have a line of sight of every cooling hole on blade 14 and will see the same oblique view of the cooling hole every time. Thus, the distance between the cooling holes and the reference holes will also be the same every time. Preferably, fixed focus cameras are used such that the entire best-plane can be brought into focus.

Fixture 14 and cameras 12A-12C are affixed to tabletop 20 within housing 22 so system 10 will obtain nearly identical images of each and every blade (that is the same as blade 24) loaded into fixture 14. Cameras 12A-12C and fixture 14 are secured to tabletop 20 using any suitable mounting means such that they are immovable once set into position. Cameras 12A-12C and fixture 14 can be removably attached to tabletop 20 so that they can be replaced in the exact same orientation and configuration every time.

Figure 4:
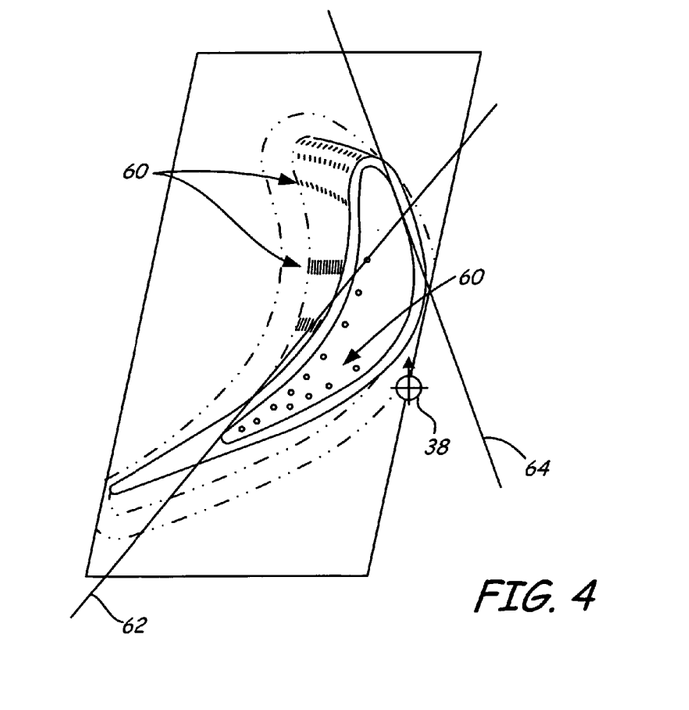
FIG. 4 shows a diagram of the top of a turbine blade showing the best-planes of the blade.

FIG. 4 shows the tip side of turbine blade 24 showing the best-planes and the various locations of cooling holes 60. Camera 12B is set up to view best-plane 62 for the pressure side and camera 12C is set up to view best-plane 64 for the suction side of blade 24. The best-plane for the top side of blade 24 is generally parallel to tabletop 20 and to the plane of FIG. 5. Reference hole 38 is seen within the top side best-plane, as well as each of cooling holes 60. Thus, camera 12A captures in a single image reference hole 38 and a plurality of cooling holes 60. Coordinates relating to the overall dimensions of blade 24 and the design location of each of the cooling holes and other features or parameters of blade 24 are loaded into computer 18. Software 19 of computer 18 then calculates actual coordinates for the distance of each cooling hole 60 in view of camera 12A from reference hole 38 for comparison with the actual coordinates. Any type of coordinate systems or grid referencing system, such as an (x, y) coordinate pair system can be used.

Figure 5:
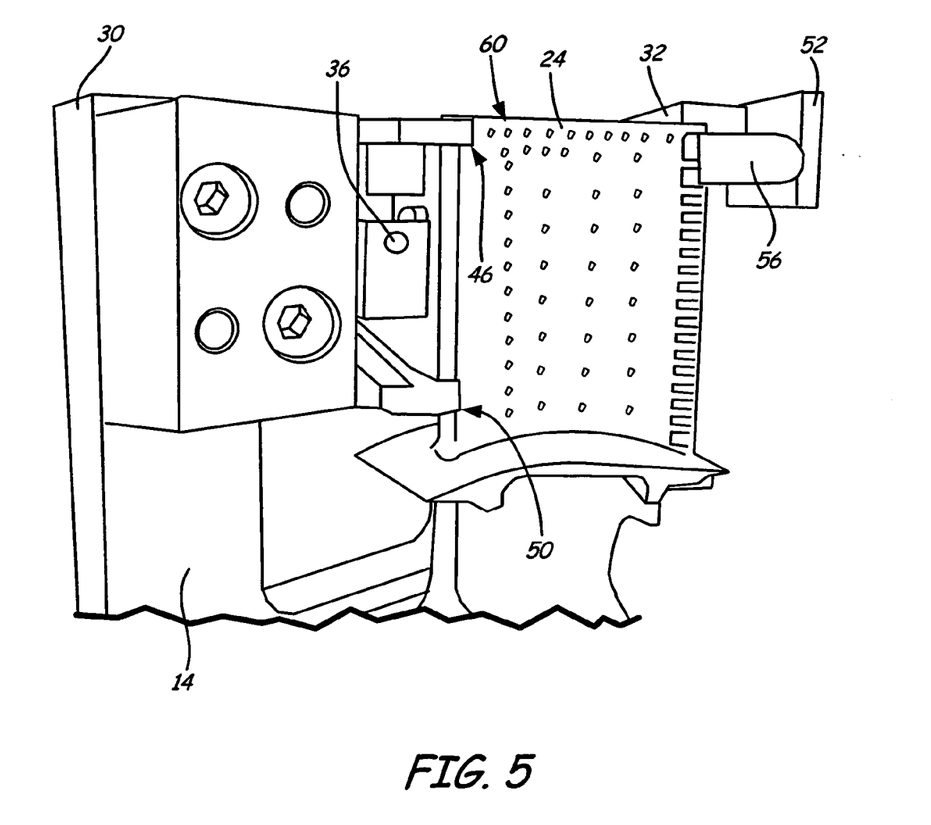
FIG. 5 shows a partially cut-away view of the pressure side of a turbine blade positioned in the fixture of FIG. 2.

FIG. 5 shows the pressure side of blade 24 positioned within fixture 14. Blade 24 includes multiple cooling holes 60 arranged in a generally column and row fashion on the pressure side surface of blade 24. Clamp 52 retains blade 24 within fixture 14. Blade 24 is nested with fixture 14 at nest points 40-50. Fixture 14 accepts blade 24 such that blade 24 contacts all nest points 40-50 in only one way. The locations of reference holes 34, 36 and 38 on fixture 14 relative to nest points 40-50 are precisely designed and carefully positioned during fabrication of fixture 14. Therefore, the position of blade 24 relative to nest points 40-50 will always be the same whenever blade 24, or another exact blade, is mounted in fixture 14. Thus, the position of cooling holes 60 will be related to reference holes 34, 36 and 38; and be in the view of cameras 12A-12C, the same way every time blade 24 is loaded in fixture 14.

Figure 6:
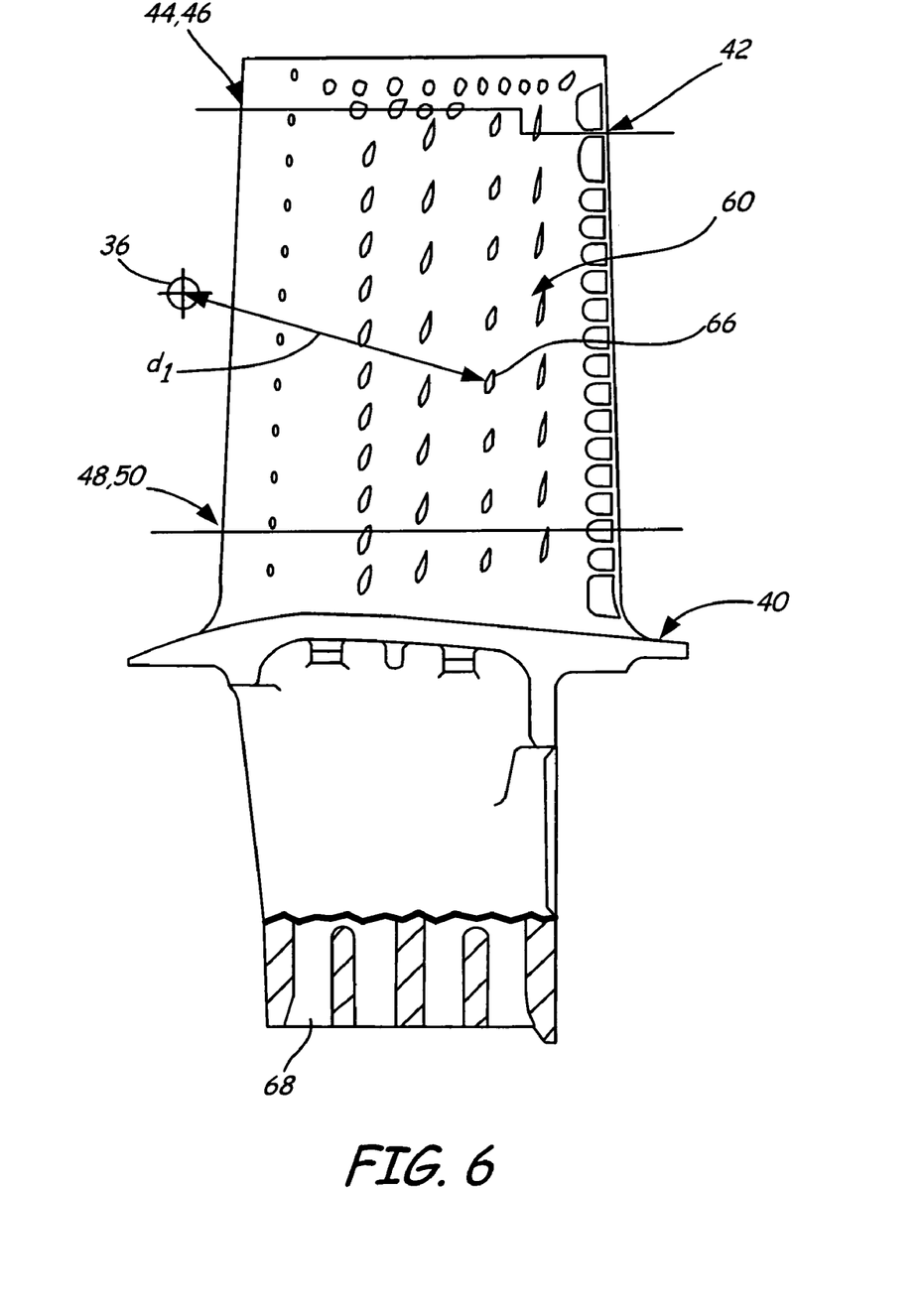
FIG. 6 shows a partially cut-away schematic view of the pressure side of a turbine blade as seen from the pressure side best-plane in the fixture.

FIG. 6 shows a partially cut-away schematic view of the pressure side of turbine blade 24 as seen along pressure side best-plane 62. Best-plane 62 encompasses pressure side reference hole 36 and a plurality of cooling holes 60 on the pressure side, such as cooling hole 66. The root or bottom of blade 24 is cut away to show cooling passages 68, which allow cooling fluid to enter blade 24. Cooling hole 66 allows some of the cooling fluid to escape blade 24 and cool the pressure side surface. Fixture 14 clamps onto blade 24 at nest points 40-50 (as indicated by the reference planes shown in FIG. 6). Distance $d_1$ between reference hole 36 and cooling hole 66 should be the same every time a finished blade 24 is mounted in system 10. The distance of $d_1$ depends on three factors: 1) blade 24 being properly mated with nest points 40-50; 2) camera 12B having the same line of sight of blade 24; and 3) cooling hole 66 being positioned on blade 24 in the same spot. Factors 1 and 2 depend on system 10, which is setup such that these factors are reproducible to an acceptable tolerance level. Factor 3 depends on the reproducibility of the manufacturing processes used to fabricate blade 24, which is what system 10 is designed to inspect. For, example, the machining techniques used in the fabrication of blade 24 must drill or otherwise produce cooling holes 60 on blade 24 within acceptable tolerances every time. The pressure side cooling holes 60 include a variety of precisely determined shapes and are arranged in a precise pattern to achieve complete cooling coverage of the blade surface. Therefore, it is necessary to determine and verify precise locations and shapes for each of the cooling holes relative to blade 24, which can be accomplished using video images of blade 24.

Figure 7:
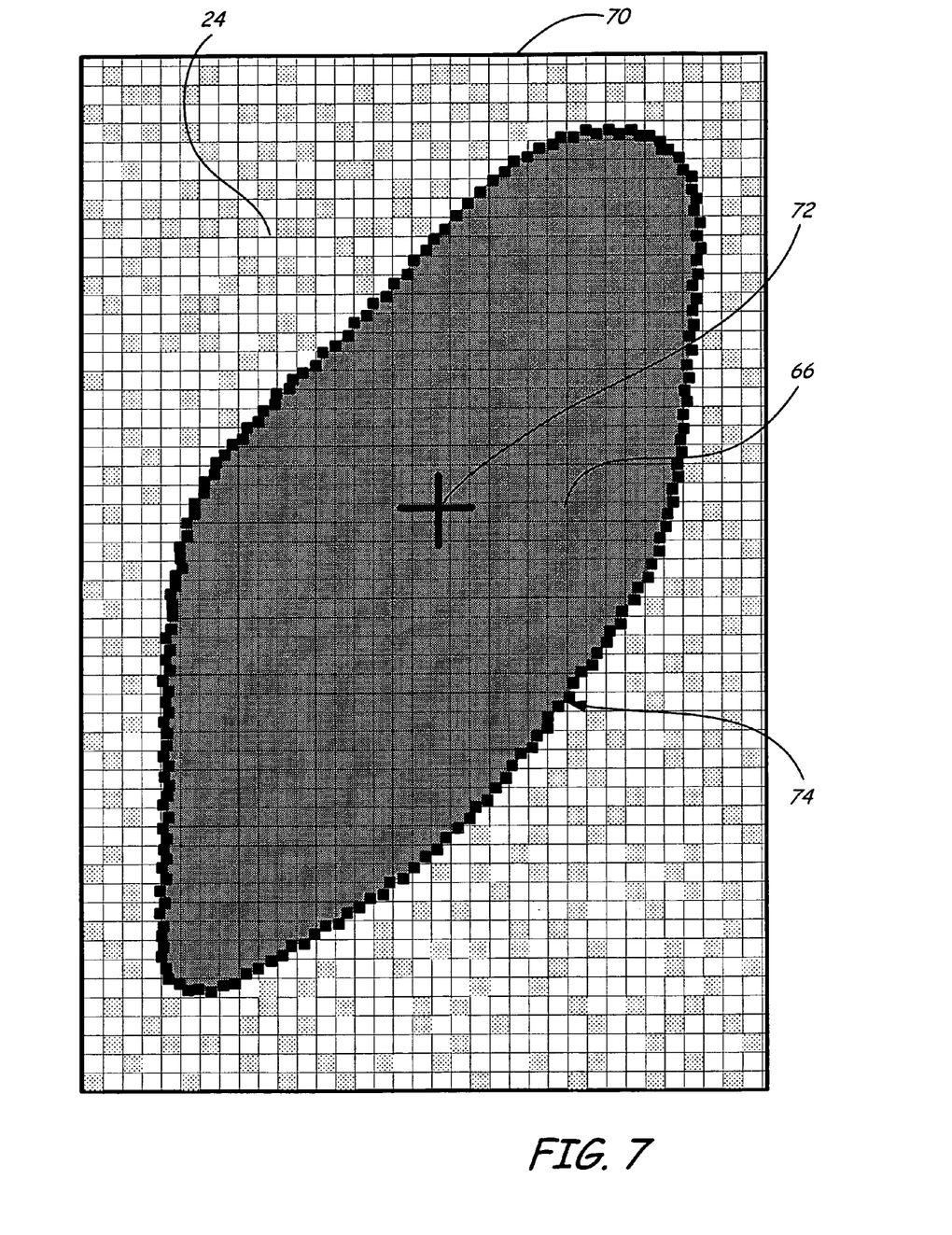
FIG. 7 shows a video image of a cooling hole with an assigned reference position obtained with the present invention.

FIG. 7 shows video image 70 of cooling hole 66 with assigned reference position 72. Software 19, through computer 18 and camera 12B, obtains video image 70 of blade 24. Software 19 includes video imaging and data processing software, which are used in conjunction to locate the cooling holes on a reference coordinate system. The reference coordinate system can be keyed off of one or more of reference points 34-38.

The imaging software graphically captures the position of at least one of the reference points and multiple cooling holes, as shown in FIG. 6. Video image 70 shows a view of the opening of cooling hole 66 from the perspective of camera 12B positioned perpendicular to best-plane 62. From this perspective, hole 66 has a particular shape. Software 19 detects visual or contrast differences between hole 66 and the surface of blade 24 and assigns a series of points 74 along the contrast boundary, which coincides with the periphery of the shape. The software also locates reference holes 34-38 by a similar method. Thus, system 10 can locate the shape of cooling holes, as well as any other feature of blade 24 that is detectable by cameras 12A-12C, for comparison with a database of design hole shapes and locations. Once a shape for cooling hole 66 has been determined by points 74, a coordinate location can be determined for the location of cooling hole 66 based on that shape. Data processing software determines the coordinate location based on a calculated centroid of each cooling hole based on the shape. For example, in one embodiment, the center mass of the shape of points 74 can be calculated and used as the point for the location of the hole. If the determined centroid does not match a design centroid, then either the hole is in the wrong place or the hole has the wrong shape. The coordinate location is based off the chosen reference coordinate system determined from the reference points.

The ability of software 19 to assign points 74 to hole 66 depends on the ability of camera 12B to detect a difference in the contrast of blade 24 and hole 66. While system 10 will operate in any lighting condition, the repeatability of system 10 assigning the same coordinates to hole 66 depends on the contrast, which is related to the lighting around system 10. System 10 will produce similar results in similar lighting situations. Light sources 13A-13C are included in system 10 in order to create similar lighting conditions each time system 10 is used. Light sources 13A-13C enhance the repeatability of system 10 by standardizing the lighting situation used to obtain video image 70. Light sources 13A-13C are preferably LED lights, which minimize effects of ambient lighting and reduce the amount of glare produced.

Because software 19 can determine a boundary layer for any shape of points 74, software 19 can assign a coordinate location to each cooling hole regardless of whether or not the camera has a straight-on or an oblique view of the hole. So long as there is sufficient contrast between the hole and the surface of the blade, software 19 can determine a coordinate location for the hole based on the shape of that hole that the camera views. Thus, software 19 can determine a position for each cooling hole without having a gun-barrel view of the cooling hole. System 10, therefore, is able to determine the location of multiple features or cooling holes with a single video image because any oblique view of a cooling hole will suffice to locate the hole.

The determined coordinate pair and shape can be compared with coordinates and shapes from design parameters that have been entered into computer 18, and compared with respect to the same reference coordinate system. The design parameters, including the shape and the location coordinates for each hole, can either be mathematically determined and entered into computer 18, or can be obtained from a reference blade on which the features and cooling holes are known to be in correct positions. The design hole location and shape are normalized to the perspective in which the cameras will view them when secured in fixture 14 of system 10. It is, therefore, critical that blade 24 be mounted in fixture 14 in a precise, known orientation, and that cameras 12A-12C be positioned to view blade 24 in precise, known orientations. Thus, by virtue of blade 24 being fixed in fixture 14 at nest points 40-50, the location of every point on the surface of blade 24, including a plurality of cooling holes 60, can be related to each reference point 34-38.

Although the present invention has been described with reference to preferred embodiments, workers skilled in the art will recognize that changes may be made in form and detail without departing from the spirit and scope of the invention.

The invention claimed is:

1. An inspection system for locating multiple features on an exterior of an object, the inspection system comprising:
  a fixture for securing the object comprising:
    a plurality of nest points for mating with specific positions on the exterior of the object; and
    a reference point located at a specific position relative to the nest points and within a best-plane of the object;
  a camera positioned normal to the best-plane of the object for obtaining video images of a plurality of the features and the reference point;
  a computer in communication with the camera for collecting the video images; and
  software for determining actual location of the features relative to the reference point based on the video images, wherein the object comprises a blade for a gas turbine engine and the features comprise cooling holes located on facets of the blade.

2. The inspection system of claim 1 wherein the camera is a fixed-focus camera.

3. The inspection system of claim 1 and further comprising an LED light source to enhance contrast between the object and the features.

4. The inspection system of claim 1 wherein the best-plane comprises a plane in which a plurality of the multiple features on the exterior of the object are visible from a single vantage point of the camera.

5. The inspection system of claim 1 and further comprising:
a plurality of best-planes for the object;
a plurality of reference points on the fixture; and
a camera provided for each best-plane such that it captures at least one of the reference points.

6. The inspection system of claim 1 wherein the reference point comprises a circular hole in the fixture.

7. The inspection system of claim 6 wherein a plane parallel to a front of the hole is parallel to the best-plane.

8. The inspection system of claim 1 wherein the software includes design parameters for each of the features normalized to a best-plane view of the camera and compares the design parameters of the features with actual parameters of the features.

9. The inspection system of claim 8 wherein the software locates the actual parameters and design parameters on a coordinate system referenced from the reference point.

10. The inspection system of claim 8 wherein the parameters include location and shape.

11. The inspection system of claim 1 wherein the software:
determines a plurality of points around the periphery of each feature as visible from the best-plane to define a shape;
determines a centroid of the shape;
assigns a coordinate location to the centroid relative to a reference point; and
compares the coordinate location to a design coordinate location for the shape.

12. A method for locating multiple features on an object, the method comprising:
positioning the object in a fixture such that the fixture mates with the object at specific nest points;
positioning a reference point on the fixture relative to the nest points and within a best-plane of the object;
positioning a camera along a best-plane of the object such that it has a view of multiple features within the best-plane and the reference point;
capturing a video image of the object including a plurality of the features and the reference point; and
performing software analysis of the video image to locate actual positions of the plurality of features relative to the reference point, wherein the object comprises a blade for a gas turbine engine and the features comprise cooling holes located on the facets of the blade.

13. The method of claim 12 and further comprising the step of shining a light source at the object in order to produce contrast between the object and the features.

14. The method of claim 12 wherein the best-plane comprises a plane in which a plurality of the features on the exterior of the object are visible from a single vantage point, of the camera.

15. The method of claim 12 wherein the step of positioning a reference point comprises positioning a circular hole in the fixture in a plane parallel to the best-plane.

16. The method of claim 12 and further comprising the step of comparing the actual positions with design positions for each of the features normalized to a best-plane view of the camera.

17. The method of claim 12 and further comprising:
determining a plurality of points around the periphery of each feature as visible from the best-plane to define a shape;
determining a centroid of the shape;
assigning a coordinate location to the centroid relative to a reference point; and
comparing the coordinate location to a reference coordinate location for the shape.

18. The method of claim 12 wherein the software analysis determines a shape of each feature for comparison with a design shape of the feature.

* * * * *